United States Patent [19]

Seno

[11] 4,422,170
[45] Dec. 20, 1983

[54] TURNTABLE APPARATUS

[75] Inventor: Mitsuru Seno, Fukaya, Japan

[73] Assignee: Tokyo Shibaura Denki Kabushiki Kaisha, Kawasaki, Japan

[21] Appl. No.: 349,822

[22] Filed: Feb. 18, 1982

[30] Foreign Application Priority Data

Feb. 19, 1981 [JP] Japan ............................ 56-21449[U]

[51] Int. Cl.$^3$ ............................................ G11B 25/04
[52] U.S. Cl. .................................................. 369/270
[58] Field of Search ............... 369/264, 270, 271, 258, 369/263, 77

[56] References Cited

U.S. PATENT DOCUMENTS 4,272,794 6/1981 Skarky .................................. 360/97
4,326,284 4/1982 Elliott ................................. 369/270

Primary Examiner—Steven L. Stephan
Attorney, Agent, or Firm—Cushman, Darby & Cushman

[57] ABSTRACT

A turntable apparatus bears and rotates a disc inserted into a reproducing apparatus for signals recorded on the disc through a casing inlet opening. The turntable apparatus comprises a turntable rotatably supported on a chassis to move vertically and a center spindle rotatably supported coaxially with an axis of rotation of the turntable and received in a recess at the center portion of the turntable to move vertically. When the turntable is in its nonreproducing position, it is located below the casing inlet opening, and the center spindle is wholly contained in the recess. When the turntable is in its reproducing position, it is located above the casing inlet opening to bear the disc thereon, and the center spindle projects above the top surface of the turntable.

9 Claims, 5 Drawing Figures

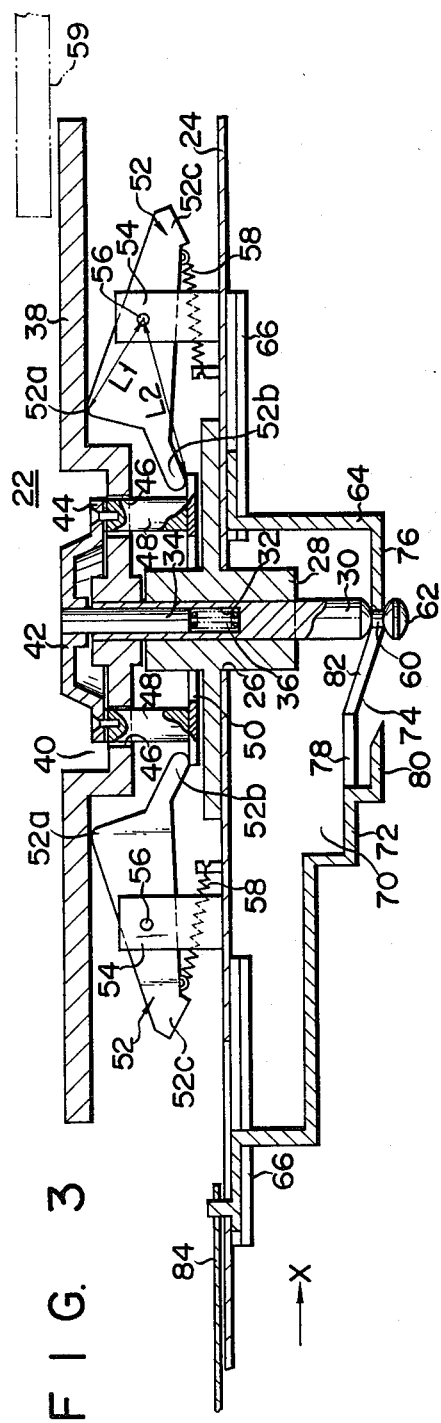
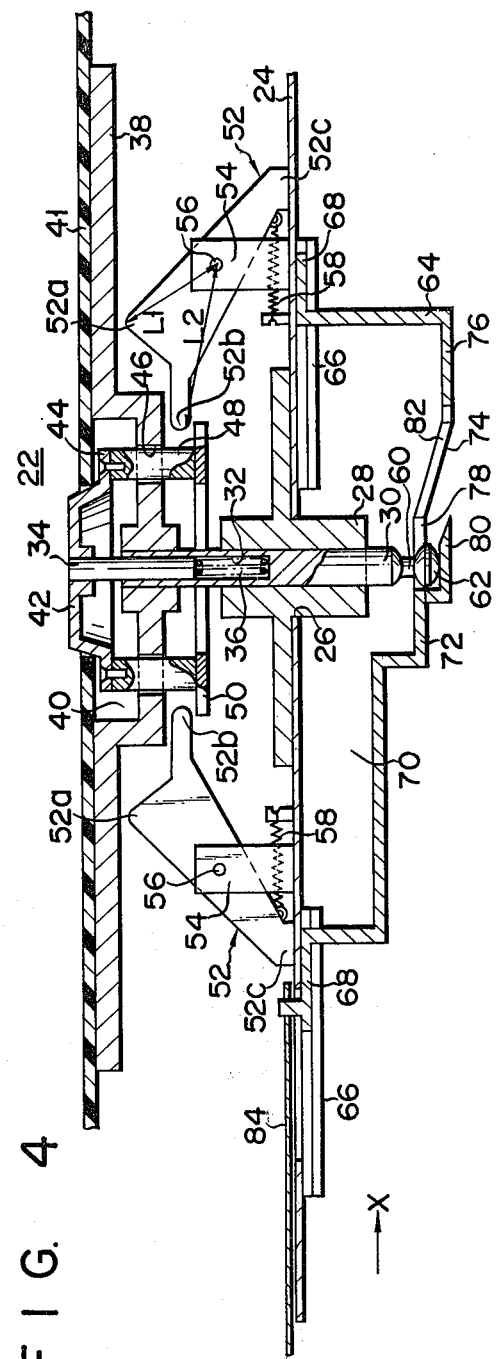

TURNTABLE APPARATUS

BACKGROUND OF THE INVENTION

This invention relates to a turntable apparatus having a vertically movable turntable, more specifically to a turntable apparatus well adapted to a reproducing apparatus for signals recorded on a disc.

Generally, in a reproducing apparatus for signals recorded on a disc, a video disc, for example, is set on a turntable, and a reproducing stylus is brought into contact with the video disc to reproduce information recorded on the disc. The information is composed of video and audio signals, and is recorded with very high density according to PCM (pulse code modulation) recording system. Therefore, if any foreign matters, such as dust, dirt from the hands, etc., stick to the video disc, reproduction cannot be performed with success, involving noise in reproduced pictures. Accordingly, there have been developed various kinds of apparatus which are provided with means for enabling us to set on and remove the video disc from the turntable without directly touching the disc.

Hereupon, the video disc is contained in a casing opening on one side, enclosed with a holder which is locked to the casing. In this state, the video disc is inserted into the reproducing apparatus from one side thereof on which a casing inlet opening is provided. When the insertion is completed, the video disc with the holder is held in the reproducing apparatus, and the holder is unlocked and disengaged from the casing. When the casing is removed from the apparatus, the video disc and the holder slip out from one side of the casing to remain in the reproducing apparatus, thus making the casing empty. In this state, reproducing operation is started. When the empty casing is inserted into the reproducing apparatus from the one side thereof after the reproducing operation is completed, the video disc with the holder is put into the casing from the one side thereof, and the holder is locked to the casing. Then, when the casing is removed from the reproducing apparatus, both the video disc and the holder are taken out from the reproducing apparatus as they are held together in the casing.

In order to accomplish the aforesaid operation, the turntable to bear the video disc can move vertically so that it may be located below the plane along which the video disc is inserted in the nonreproducing mode, that is, below the casing inlet opening provided on the apparatus and that it may be moved up to carry only the video disc thereon in the reproducing mode. A turntable apparatus with such a turntable is generally constructed as shown in FIGS. 1 and 2. A chassis 10 is fitted with a bearing 12 penetrating the same. The bearing 12 supports a turntable shaft 14 so that the shaft 14 may move vertically and rotatably about an axis thereof. A turntable 16 is coaxially fixed on the upper portion of the turntable shaft 14. A center spindle 18 is coaxially coupled to the top end of the turntable shaft 14. As shown in FIG. 2, the center spindle 18 is intended to align the center of a video disc 20 placed on the turntable 16 with the axis of rotation of the turntable 16, so that the top surface of the center spindle 18 is located above the top surface of the turntable 16.

Therefore, a casing 21 containing the video disc 20 need be passed over the center spindle 18 which is located above the turntable 16. Namely, in the prior art turntable apparatus, the stroke of the vertical movement of the turntable 16 cannot help being considerable. Accordingly, the motor for moving the turntable 16 is subjected to heavy load, and the reproducing apparatus cannot be improved in compactness.

SUMMARY OF THE INVENTION

This invention is contrived in consideration of these circumstances, and is intended to provide a turntable apparatus reduced in the movement stroke of the turntable to relieve the load applied to the motor for driving the turntable, and to ensure compact design of a reproducing apparatus in which the turntable apparatus is incorporated.

According to an aspect of the present invention, there is provided a turntable apparatus which bears and rotates a disc inserted into a reproducing apparatus for signals recorded on the disc through a disc inlet opening formed in the reproducing apparatus, comprising a chassis, a turntable having a disc mounting surface and a recess at the central portion thereof, and rotatably supported on the chassis to move vertically between a first position where the disc mounting surface is located below the disc inlet opening and a second position where the disc mounting surface is located above the disc inlet opening to bear the disc thereon, a center spindle having a surface for regulating a disc mounting position, supported coaxially with an axis of rotation of the turntable, and received in the recess to move vertically between a third position where the surface for regulating the disc mounting position is located below the disc mounting surface and a fourth position where the surface for regulating the disc mounting position is located above the disc mounting surface to regulate the disc mounting position, and a moving mechanism for moving the center spindle from the third position to the fourth position as the turntable moves from the first position to the second position, and moving the center spindle from the fourth position to the third position as the turntable moves from the second position to the first position, said moving mechanism including two pins with its upper ends attached to the center spindle and its lower ends penetrating the bottom of the recess of the turntable to be led out downward, and two regulating members rockably mounted on the chassis and having a first portion capable of engaging the under surface of the turntable, the first portion and the pivotal point of the regulating member being spaced at a prescribed distance, and a second portion capable of engaging the pins, the second portion and the pivotal point being spaced at a distance greater than the prescribed distance.

BRIEF DESCRIPTION OF THE DRAWINGS

FIG. 3 is a sectional view showing a turntable apparatus of one embodiment according to this invention in the nonreproducing mode;

FIG. 4 is a sectional view showing the apparatus of FIG. 3 in the reproducing mode.

DETAILED DESCRIPTION OF THE PREFERRED EMBODIMENT

Figure 1:
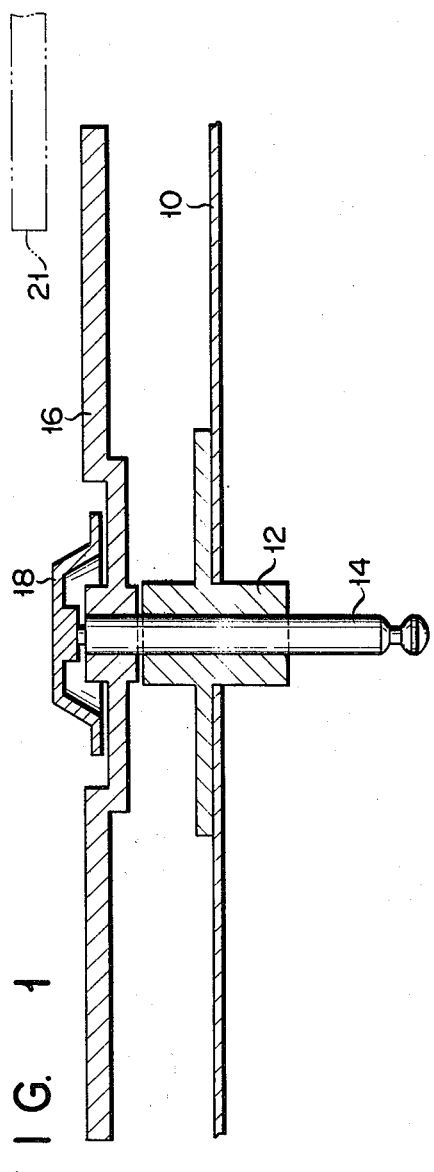
FIG. 1 is a sectional view showing a prior art turntable apparatus in the nonreproducing mode.
Figure 2:
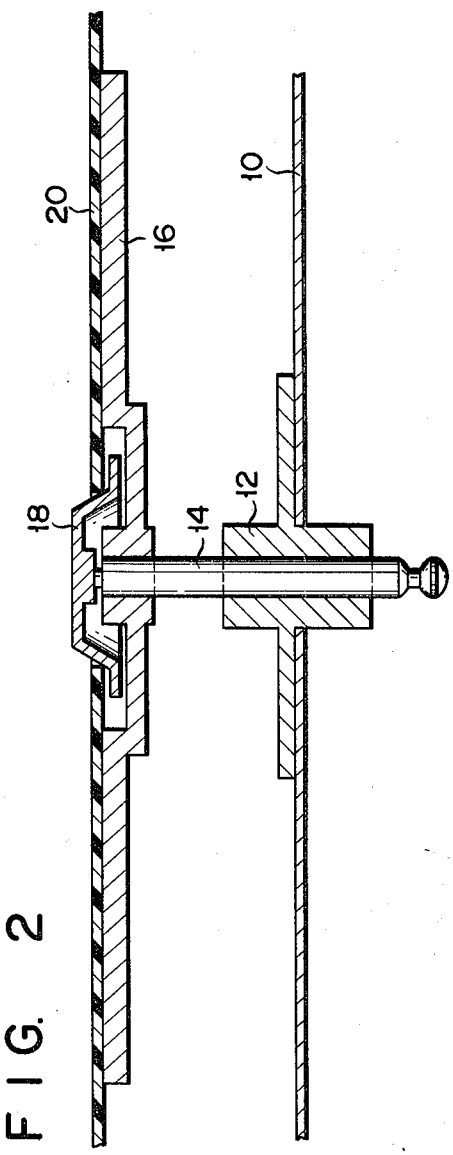
FIG. 2 is a sectional view showing the apparatus of FIG. 1 in the reproducing mode.
Figure 5:
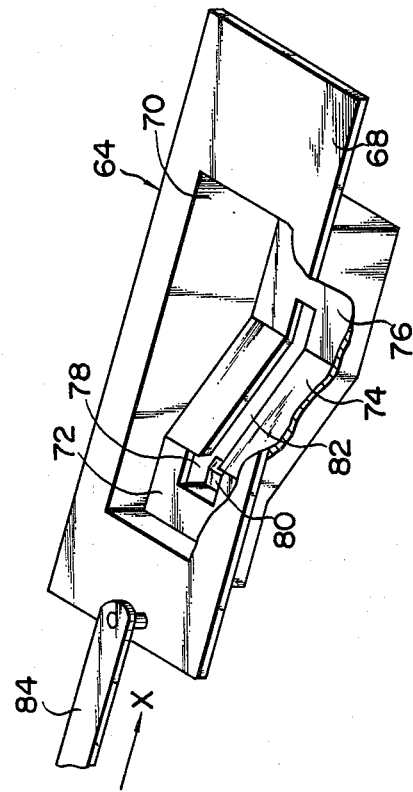
FIG. 5 is a partially broken perspective view of a slider.

Now there will be described in detail a turntable apparatus 22 of one embodiment according to this invention with reference to the accompanying drawings of FIGS. 3 to 5.

A reproducing apparatus (not shown in detail) for signals recorded on a video disc provided with the turntable apparatus 22 has a horizontally extending chassis 24 therein. Formed in a predetermined position of the chassis 24 is an aperture 26, through which a bearing unit 28 extends to be attached to the chassis 24. A turntable shaft 30 is supported by the bearing unit 28 to rotate about a longitudinal axis thereof and to slide vertically.

A bore 32 having a given depth and coaxial with the turntable shaft 30 opens in the central portion of the top end surface of the turntable shaft 30. A center spindle shaft 34 is inserted in the bore 32 to slide vertically. The upper end portion of the center spindle shaft 34 projects outward from the turntable shaft 30. A compression coil spring 36 is fitted in the bore 32 between the bottom of the bore 32 and the under surface of the center spindle shaft 34. The spring 36 urges the center spindle shaft 34 to project from the turntable shaft 30, that is, in the vertical direction of FIGS. 3 and 4.

A turntable 38 is fixed on the outer peripheral surface of the upper end portion of the turntable shaft 30 to be coaxial therewith. A circular recess 40 with a given depth is formed in the central portion of the turntable 38. The top surface of the turntable 38 except for the recess 40 is defined as a mounting surface for a video disc 41 (shown in FIG. 4). On the other hand, a center spindle 42 for centering the video disc 41 is fixed on the outer peripheral surface of the upper end portion of the center spindle shaft 34 to be coaxial therewith. The center spindle 42 is substantially conical, and is fitted with a flange portion 44 around the whole circumference of the bottom portion thereof. The slope of the center spindle 42 functions as a regulating surface to regulate the position of the video disc 41. The center spindle 42 is so sized as to be able to be wholly received in the recess 40. Namely, the height of the center spindle 42 is not greater than the depth of the recess 40. Therefore, the top surface of the center spindle 42 is located flush with or below the top surface of the turntable 38 or the video disc mounting surface when the center spindle 42 is depressed against the urging force of the spring 36 to the position where the under surface of the center spindle 42 abuts against the bottom of the recess 40.

Two apertures 46 are formed in the bottom of the recess 40 corresponding to the flange portion 44 of the center spindle 42, facing each other with the turntable shaft 30 between them. A pin 48 is loosely fitted in each of the apertures 46, extending vertically therethrough. The upper and lower ends of the pin 48 are located inside the recess 40 and in a space between the turntable 38 and the chassis 24, respectively. The top end face of each pin 48 is attached to the under surface of the flange portion 44 by means of a screw. The two pins 48 in their corresponding apertures 46 are of the same length. The respective bottom end faces of the pins 48 are attached to a common ring-shaped member 50 by means of screws (not shown). The ring-shaped member 50 is coaxial with the turntable shaft 30. The outer periphery of the ring-shaped member 50 projects outward from the pins 48 by a given distance, centering around the turntable shaft 30.

Two regulating members 52 are rockably mounted on the chassis 24 surrounding the ring-shaped member 50, facing each other with the turntable shaft 30 between them. Each of the regulating members 52 is pivotally mounted by means of a pin 56 on a mounting strip 54 fixed upright on the chassis 24 so that the regulating member 52 can rock along a vertical plane. The regulating member 52 includes a first engaging portion 52a at a distance L1 from the rocking center of the regulating member 52 and capable of engaging the under surface of the turntable 38, a second engaging portion 52b at a distance L2 from the rocking center of the regulating member 52 and capable of engaging the top surface of the ring-shaped member 50, and a third engaging portion 52c capable of engaging the top surface of the chassis 24. Here the distance L2 is greater than the distance L1. When the regulating member 52 rocks through a given angle, therefore, the second engaging portion 52b moves through a greater vertical distance than the first engaging portion 52a does. The first and second engaging portions 52a and 52b of the regulating member 52 are located on the same side of the pin 56 with the turntable shaft 30, while the third engaging portion 52c l is disposed on the opposite side. A tension coil spring 58 is stretched between the third engaging portion 52c of the regulating member 52 and the chassis 24. The coil spring 58 urges the regulating member 52 to lift up its first and second engaging portions 52a and 52b. The regulating member 52 may be rocked by the urging force of the spring 58 until the third engaging portion 52c abuts against the chassis 24.

When the turntable 38 is in its nonreproducing position, as shown in FIG. 3, it is located below a casing inlet opening through which a casing 59 containing the video disc 41 is to be inserted. In this nonreproducing mode, the regulating member 52 is rocked against the urging force of the spring 58, with its first engaging portion 52a pressed by the under surface of the turntable 38. Accordingly, the ring-shaped member 50 is depressed against the urging force of the spring 36 by the second engaging portion 52b of the regulating member 52. In this depressed position, the center spindle 52 is wholly contained in the recess 40.

On the other hand, when the turntable 38 is in its reproducing position, as shown in FIG. 4, it is located above the casing inlet opening to bear the video disc 41 thereon. In this reproducing mode, the first engaging portion 52a of the regulating member 52 is released from the press by the under surface of the turntable 38, and the regulating member 52 is free. Accordingly, the regulating member 52 is rocked by the urging force of the spring 58 until its third engaging portion 52c abuts against the chassis 24. Accompanying such rocking, the second engaging portion 52b of the regulating member 52 also rocks, and the ring-shaped member 50 and hence the center spindle 42 are biased upward by the urging force of the spring 36. Since the distance L2 is greater than the distance L1, the upward movement of the center spindle 42 is greater than the upward movement of the turntable 38. Thus, the top portion of the center spindle 42 projects above the top surface of the turntable 38. The upward projection is regulated by the slope of the center spindle 42 abutting against the inner peripheral surface of the center hole of the video disc 41. The video disc 41 is positioned through the engagement between the slope of the center spindle 42 and the inner peripheral surface of the center hole of the video disc 41. In this engaged position, the second engaging portion 52b of the regulating member 52 is disengaged from the ring-shaped member 50, as shown in FIG. 4. Thus, the regulating member 52 ceases to prevent the turntable 38 from rotating.

An annular groove 60 is formed at the lower end portion of the turntable shaft 30, and a bottom end face 62 of the turntable shaft 30 is formed of a smooth arcuated surface.

The position of the turntable 38 along the axis is defined by a slider 64 as driving means. The slider 64 is slidably supported by a pair of slider supports 66 mounted on the under surface of the chassis 24 along the direction shown by an arrow X. The slider 64, as shown in detail in FIG. 5, has a base plate 68. A recess 70 is formed substantially in the center of the base plate 68. The bottom of the recess 70 is defined by a first flat bottom plate 72 at a given depth below the level of the base plate 68, an inclined bottom plate 74 adjacent to the first flat bottom plate 72, declining in the direction shown by the arrow X, and a second flat bottom plate 76 adjoining the inclined bottom plate 74 at a depth, below the under surface of the first flat bottom plate 72, corresponding to the vertical movement of the turntable 38. These bottom plates are arranged in the order named in the direction shown by the arrow X.

A large opening 78, the width of which is larger than the diameter of the turntable shaft 30, is formed in that portion of the first flat bottom plate 72 which is adjacent to the inclined bottom plate 74. A supporting plate 80 which receives the bottom end face 62 of the turntable shaft 30 is attached to the first flat bottom plate 72 so as to be located under the opening 78. The supporting plate 80 is disposed parallel to the first flat bottom plate 72 at a space therefrom. The front end portion of the supporting plate 80 is tapered in the direction shown by the arrow X to facilitate the reception of the bottom end face 62 of the turntable shaft 30 thereby.

A slit 82 is formed along the direction shown by the arrow X in the inclined bottom plate 72 and a part of the second flat bottom plate 76 to be continuous with the opening 78. The width of the slit 82 is smaller than the diameter of the turntable shaft 30 and larger than the diameter of the annular groove 60. The turntable shaft 30 is supported on the slider 64 through engagement between the periphery of the slit 82 and the periphery of the annular groove 60 on the turntable shaft 30.

One end of a drive lever 84 is connected to the rear portion of the base plate 68 of the slider 64 on the upper stream side thereof with respect to the movement in the direction shown by the arrow X. The other end of the drive lever 84 is connected to a drive source (not shown), which drives the drive lever 84 to move in the direction shown by the arrow X in response to a reproduction instruction given by depressing the operating button of the reproducing apparatus.

Now there will be described the operation of the turntable apparatus 22 of the above-mentioned construction.

In the nonreproducing mode, the slider 64 is driven to the position shown in FIG. 3 by means of the drive lever 84, with the periphery of the annular groove 60 on the turntable shaft 30 engaged with the periphery of that portion of the slit 82 formed in the second flat bottom plate 76. Thus, the turntable 38 is located below the casing inlet opening. As for the center spindle 42, it is located inside the recess 40, and its top portion is not projected above the top surface of the turntable 38. Thus, the casing 59 containing the video disc 41 therein is allowed to be inserted right above and along the turntable 38.

The video disc 41 in the reproducing apparatus is taken out from the casing 59, and is vertically movably supported and held inside the apparatus and above the turntable 38 by a supporting member (not shown). In this state, the casing 59 is removed from the reproducing apparatus.

When the operating button of the reproducing apparatus is depressed to give the video disc 41 the reproduction instruction, the drive lever 84 gradually moves the slider 64 along the direction shown by the arrow X by means of the drive source (not shown). In response to the movement of the slider 64, the engagement between the periphery of the annular groove 60 on the turntable shaft 30 and the periphery of that portion of the slit 82 in the second flat bottom plate 76 is replaced by the engagement between the periphery of the annular groove 60 and the periphery of that portion of the slit 82 in the inclined bottom plate 74. The turntable shaft 30 is lifted along the slope of the inclined bottom plate 74. Therefore, the video disc 41 is mounted on the turntable 38 at the same time as the video disc 41 is released from the support of the supporting members. When the periphery of the annular groove 60 of the turntable shaft 30 reaches the opening 78 in the first flat bottom plate 72, the engagement is released and the bottom end face 62 of the turntable shaft 30 is supported by the supporting plate 80.

As the turntable 38 ascends, the regulating member 52 is rocked by the urging force of the spring 58, so that the center spindle 42 also ascends by the agency of the urging force of the spring 36. The rise of the center spindle 42 is greater than the rise of the turntable 38. As the center spindle 42 ascends, therefore, its slope abuts against the inner peripheral surface of the center hole of the video disc 41, thereby locating the video disc 41 in proper position on the turntable 38, as shown in FIG. 4.

In this position, signals recorded on the video disc 41 may be reproduced by a reproducing stylus. The turntable 38 is rotated by the other drive mechanism (not shown). The driving force of the other drive mechanism is transmitted to the turntable 38 by means of a belt (not shown). Therefore, even if the turntable 38 vertically vibrates, the driving force will securely be transmitted to the turntable 38.

When the reproduction is completed, the other drive mechanism stops rotating the turntable 38, and the drive source for the turntable 38 moves the drive lever 84 in the direction opposite to the direction shown by the arrow X. Therefore, the slider 64 moves in the same opposite direction. The turntable shaft 30 is removed from the position where the bottom end face 62 of the turntable shaft 30 engages the supporting plate 80 of the slider 64, and is then located in the position where the periphery of the annular groove 60 on the turntable shaft 30 engages the periphery of that portion of the slit 82 formed in the inclined bottom plate 74 of the slider 64. The turntable shaft 30 descends in response to the movement of the slider 64. Therefore, the turntable 38 is moved from the position where the video disc 41 is mounted on the turntable 38 to the position where the video disc 41 is placed on the supporting member, as shown in FIG. 3. The periphery of the annular groove 60 on the turntable shaft 30 engages the periphery of that portion of the slit 82 in the second flat bottom plate 76 to stop the turntable 38 from descending and the drive source from driving the drive lever 84 stops, thus establishing the nonreproducing mode.

As the turntable 38 descends, on the other hand, its under surface presses on the first engaging portion 52a of the regulating member 52. Accordingly, the regulating member 52 rocks against the urging force of the spring 58 to cause its second engaging portion 52b to engage and depress the ring-shaped member 50. The fall of the center spindle 42 is greater than the fall of the turntable 38. As a result of such descent, therefore, the center spindle 42 is wholly contained in the recess 40. In other words, the top portion of the center spindle 42 ceases to project above the mounting surface of the turntable 38. Thus, the video disc 41 is released from the positional regulation by the center spindle 42, and is hence allowed to move horizontally.

In this state, the video disc 41 is supported by the supporting member, and kept above the mounting surface of the turntable 38, that is, substantially as high as the casing inlet opening of the reproducing apparatus. Then, the casing 59 is pushed into the apparatus through the casing inlet opening, and the video disc 41 is inserted into and locked in the casing 59. Thus, if the casing 59 is removed from the apparatus, then the video disc 41 will be taken out from the apparatus.

According to the one embodiment of this invention, as described in detail herein, the center spindle 42 for regulating the center position of the video disc 41 is moved relatively to the turntable 38 by means of the regulating member 52 in response to the vertical movement of the turntable 38, so that the top surface of the center spindle 42 is located flush with or below the mounting surface of the turntable 38 when the turntable 38 is lowered, and that the top portion of the center spindle 42 is projected above the top surface of the turntable 38 when the turntable 38 is raised. Accordingly, the stroke of the vertical movement of the turntable 38 may be set shorter to enable reduction of load on the motor for vertically moving the turntable 38, as well as compact design of the reproducing apparatus.

It is to be understood that this invention is not limited to the above-mentioned embodiment, and that various changes and modifications may be effected therein by one skilled in the art without departing from the scope or spirit of the invention.

In the above embodiment, the turntable is used for driving a video disc. However, the turntable may be applied also to audio discs or any other suitable discs for information filing, for example.

Moreover, the drive mechanism to move along the vertical direction of the turntable need not always be provided with the slider, and may be of any construction provided that it allows axial rotation.

Furthermore, the regulating member(s) may be one or more in number.

What is claimed is:

1. A turntable apparatus which bears and rotates a disc inserted into a reproducing apparatus for signals recorded on the disc through a disc inlet opening formed in the reproducing apparatus, comprising:
    a chassis;
    a turntable having a disc mounting surface, a recess in the central portion of said mounting surface and an under surface, said turntable being rotatably supported on said chassis to move vertically between a first position where said disc mounting surface is located below said disc inlet opening and a second position where said disc mounting surface is located above said disc inlet opening to bear the disc thereon;
    a center spindle having a surface for regulating a disc mounting position, supported coaxially with an axis of rotation of said turntable, and received in said recess to move vertically between a third position where said surface for regulating the disc mounting position is located below said disc mounting surface and a fourth position where said surface for regulating the disc mounting position is located above said disc mounting surface to regulate the disc mounting position; and
    a moving mechanism for moving said center spindle from said third position to said fourth position as said turntable moves from said first position to said second position, and moving said center spindle from said fourth position to said third position as said turntable moves from said second position to said first position, said moving mechanism including at least one pin with its upper end attached to the center spindle and its lower end penetrating the bottom of the recess of the turntable to be led out downward, and at least one regulating member rockably mounted on the chassis and having a first portion capable of engaging the under surface of the turntable, the first portion and the pivotal point of the regulating member being spaced at a prescribed distance, and a second portion capable of engaging the pin, the second portion and the pivotal point being spaced at a distance greater than the prescribed distance.

2. The turntable apparatus according to claim 1, which further comprises a first urging member for urging said center spindle to move from said third position toward said fourth position.

3. The turntable apparatus according to claim 2, wherein said first urging member is a compression coil spring.

4. The turntable apparatus according to claim 2, wherein said pin has a projected portion projecting outward at the lower part thereof, and the second portion of said regulating member is caused to abut against the top surface of said projected portion by the urging force of said first urging member.

5. The turntable apparatus according to claim 4, wherein the surface for regulating the disc mounting position of said center spindle engages the disc, and the second portion of said regulating member is disengaged from the projected portion of said pin when said center spindle is in said fourth position.

6. The turntable apparatus according to claim 2, wherein said moving mechanism includes a second urging member for urging the first portion of said regulating member to abut against the under surface of said turntable.

7. The turntable apparatus according to claim 6, wherein said second urging member is a tension coil spring.

8. The turntable apparatus according to claim 6, wherein the first and second portions of said regulating member are located on the same side with respect to the pivotal point.

9. The turntable apparatus according to claim 8, wherein said regulating member has a third portion capable of engaging said chassis, said third portion is located on the opposite side of the pivotal point to said first and second portions, said third portion abuts against said chassis to disengage the under surface of said turntable from said first portion when said turntable is in said second position.

* * * * *